(12) United States Patent
Yokoyama et al.

(10) Patent No.: US 11,092,068 B2
(45) Date of Patent: Aug. 17, 2021

(54) VARIABLE GEOMETRY TURBOCHARGER

(71) Applicant: MITSUBISHI HEAVY INDUSTRIES ENGINE & TURBOCHARGER, LTD., Sagamihara (JP)

(72) Inventors: Takao Yokoyama, Tokyo (JP); Toru Hoshi, Tokyo (JP); Masaki Tojo, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 199 days.

(21) Appl. No.: 16/088,539

(22) PCT Filed: Mar. 30, 2016

(86) PCT No.: PCT/JP2016/060466
§ 371 (c)(1),
(2) Date: Sep. 26, 2018

(87) PCT Pub. No.: WO2017/168646
PCT Pub. Date: Oct. 5, 2017

(65) Prior Publication Data
US 2020/0123966 A1    Apr. 23, 2020

(51) Int. Cl.
*F02B 37/24* (2006.01)
*F01D 5/04* (2006.01)
*F02C 9/16* (2006.01)

(52) U.S. Cl.
CPC ............. *F02B 37/24* (2013.01); *F01D 5/043* (2013.01); *F02C 9/16* (2013.01); *F05D 2220/40* (2013.01); *F05D 2240/128* (2013.01)

(58) Field of Classification Search
CPC ........ F02B 37/24; F01D 5/043; F01D 17/165; F02C 9/16; F02C 6/12; F05D 2220/40;
(Continued)

(56) References Cited

U.S. PATENT DOCUMENTS 2,314,572 A * 3/1943 Chitz ...................... F01D 5/145
                                                          415/129
3,269,701 A * 8/1966 Miller ................... F01D 17/162
                                                          415/209.4
(Continued)

FOREIGN PATENT DOCUMENTS

DE    10 2011 077 135 A1    12/2012
EP            1225303 A2 *   7/2002    ............. F01D 5/145
(Continued)

OTHER PUBLICATIONS

Sakakida et al (JP 11229815 A) Machine Translation (Year: 1999).*
(Continued)

*Primary Examiner* — Kenneth Bomberg
*Assistant Examiner* — Brian Christopher Delrue
(74) *Attorney, Agent, or Firm* — Birch, Stewart, Kolasch & Birch, LLP.

(57) ABSTRACT

A variable geometry turbocharger includes: a turbine rotor; and a variable nozzle mechanism for adjusting a flow of exhaust gas to the turbine rotor from a scroll flow passage formed on a radially outer side of the turbine rotor. The variable nozzle mechanism includes: a nozzle vane disposed in an exhaust gas flow passage for guiding the exhaust gas to the turbine rotor from the scroll flow passage; a support wall forming a flow passage wall on a first side of the exhaust gas flow passage with respect to an axial direction of the turbine rotor and supporting the nozzle vane rotatably in a cantilever fashion; and a non-support wall forming a flow passage wall on a second side of the exhaust gas flow passage with respect to the axial direction. Of an end surface of the nozzle vane on a side of the non-support wall, an edge portion on a side of a pressure surface includes a non-support-wall side linear portion formed to have a linear shape.

13 Claims, 13 Drawing Sheets

(58) Field of Classification Search
CPC ......... F05D 2240/128; F05D 2240/301; F05D 2240/305; F05D 2240/306; F05D 2240/307; Y02T 10/144
See application file for complete search history.

(56) References Cited

U.S. PATENT DOCUMENTS

| | | | | |
|---|---|---|---|---|
| 3,295,827 A * | 1/1967 | Chapman | F01D 5/148 | 416/159 |
| 3,314,654 A * | 4/1967 | Spencer | F01D 17/162 | 415/160 |
| 3,990,810 A * | 11/1976 | Amos | F01D 17/162 | 415/161 |
| 4,307,994 A * | 12/1981 | Brewer | F01D 17/162 | 415/160 |
| 4,514,141 A * | 4/1985 | Marey | F01D 17/162 | 415/160 |
| 4,652,208 A * | 3/1987 | Tameo | F01D 5/146 | 415/148 |
| 4,705,452 A * | 11/1987 | Karadimas | F01D 17/162 | 415/115 |
| 4,863,348 A * | 9/1989 | Weinhold | F01D 5/145 | 416/92 |
| 4,874,289 A * | 10/1989 | Smith, Jr. | F04D 29/563 | 415/150 |
| 5,039,277 A * | 8/1991 | Naudet | F01D 17/162 | 415/150 |
| 5,261,227 A * | 11/1993 | Giffin, III | F01D 17/162 | 60/226.1 |
| 5,316,443 A * | 5/1994 | Smith | B01F 7/00275 | 366/270 |
| 5,362,202 A * | 11/1994 | Derouet | F01D 11/22 | 415/148 |
| 5,672,047 A * | 9/1997 | Birkholz | F01D 9/065 | 415/160 |
| 6,086,328 A * | 7/2000 | Lee | F01D 5/18 | 415/115 |
| 7,255,530 B2 * | 8/2007 | Vogiatzis | F01D 5/141 | 415/159 |
| 7,351,035 B2 * | 4/2008 | Deschamps | F01D 5/20 | 416/92 |
| 7,628,579 B2 * | 12/2009 | Giaimo | F01D 17/162 | 415/160 |
| 7,670,107 B2 * | 3/2010 | Barthelet | F01D 17/165 | 415/160 |
| 8,011,882 B2 * | 9/2011 | McMillan | F01D 9/041 | 415/148 |
| 8,500,395 B2 * | 8/2013 | Roby | F01D 17/165 | 415/164 |
| 8,807,926 B2 * | 8/2014 | Nagao | F01D 5/141 | 415/158 |
| 9,829,004 B2 * | 11/2017 | Ikeda | F04D 29/281 | |
| 10,385,765 B2 * | 8/2019 | Yokoyama | F02C 6/12 | |
| 2002/0061249 A1 * | 5/2002 | Caubet | F01D 5/143 | 415/160 |
| 2005/0141990 A1 * | 6/2005 | Guemmer | F01D 5/20 | 415/134 |
| 2005/0249593 A1 * | 11/2005 | Boury | F01D 5/187 | 416/97 R |
| 2006/0078420 A1 * | 4/2006 | Barbe | F01D 17/162 | 415/159 |
| 2006/0216140 A1 * | 9/2006 | Dervaux | F16L 41/02 | 415/115 |
| 2006/0228211 A1 * | 10/2006 | Vance | F01D 5/147 | 415/200 |
| 2007/0140837 A1 * | 6/2007 | Guemmer | F01D 5/141 | 415/160 |
| 2007/0160463 A1 * | 7/2007 | Jahns | F01D 17/162 | 415/160 |
| 2008/0152505 A1 * | 6/2008 | Burton | F01D 5/141 | 416/223 R |
| 2009/0252596 A1 * | 10/2009 | Guemmer | F04D 29/684 | 415/115 |
| 2010/0111704 A1 * | 5/2010 | Hada | F01D 5/20 | 416/97 R |
| 2010/0266389 A1 * | 10/2010 | Cloarec | F04D 29/563 | 415/148 |
| 2011/0206500 A1 * | 8/2011 | Nagao | F01D 5/141 | 415/148 |
| 2012/0210715 A1 * | 8/2012 | Shibata | F01D 5/141 | 60/670 |
| 2012/0230818 A1 * | 9/2012 | Shepherd | F01D 5/20 | 415/208.1 |
| 2014/0147265 A1 * | 5/2014 | Biemar | F01D 9/042 | 415/209.2 |
| 2014/0248154 A1 * | 9/2014 | Guemmer | F01D 5/141 | 416/223 A |
| 2014/0294557 A1 * | 10/2014 | Miyoshi | F01D 5/20 | 415/1 |
| 2015/0118059 A1 * | 4/2015 | Perrot | F01D 5/14 | 416/238 |
| 2015/0176418 A1 * | 6/2015 | Marshall | F01D 17/162 | 415/1 |
| 2015/0218955 A1 * | 8/2015 | Bintz | F01D 5/288 | 416/1 |
| 2015/0275916 A1 * | 10/2015 | Marshall | B33Y 80/00 | 415/148 |
| 2015/0330293 A1 * | 11/2015 | Yokoyama | F02C 6/12 | 415/148 |
| 2016/0290158 A1 * | 10/2016 | Slavens | F01D 17/14 | |
| 2016/0319672 A1 * | 11/2016 | Jones | F01D 5/20 | |
| 2016/0319673 A1 * | 11/2016 | Jones | F01D 5/20 | |
| 2018/0073370 A1 * | 3/2018 | Mottram | F01D 5/186 | |
| 2019/0048889 A1 * | 2/2019 | Roberge | F04D 29/324 | |
| 2019/0107118 A1 * | 4/2019 | Arai | F04D 29/384 | |
| 2019/0219031 A1 * | 7/2019 | Bangar | F03D 13/00 | |
| 2019/0249553 A1 * | 8/2019 | Lee | F01D 5/186 | |
| 2020/0102840 A1 * | 4/2020 | Bae | F01D 5/081 | |

FOREIGN PATENT DOCUMENTS

| | | | | |
|---|---|---|---|---|
| EP | 2 940 270 A1 | | 11/2015 | |
| GB | 1049080 A | * | 11/1966 | ......... F01D 17/162 |
| GB | 1112058 A | * | 5/1968 | ......... F01D 17/162 |
| JP | 80-65207 A | | 4/1985 | |
| JP | 61-126001 U | | 8/1986 | |
| JP | 11-229815 A | | 8/1999 | |
| JP | 11229815 A | * | 8/1999 | |
| JP | 2010-112223 A | | 5/2010 | |
| JP | 2010112223 A | * | 5/2010 | |
| WO | WO 2013/106503 A1 | | 7/2013 | |
| WO | WO-2014102962 A1 | * | 7/2014 | ............... F02C 6/12 |

OTHER PUBLICATIONS

Office Action dated Oct. 29, 2019 issued in the corresponding Japanese Application No. 2018-507949 with an English Translation.
International Preliminary Report on Patentabiliity dated Oct. 11, 2018 in corresponding PCT/JP2016/060466.
International Search Report of PCT/JP2016/060466 dated Jun. 21, 2016.
Office Action dated Jul. 15, 2019 issued to the corresponding European Patent Application No. 16896865.9.
Office Action dated Nov. 12, 2019 issued in the corresponding European Application No. 16896865.9.
Office Action dated May 14, 2020 issued to the corresponding European Application No. 16896865.9.
Anonymous: "Airfoil—Wikipedia", Dec. 20, 2018, pp. 1-10.
Extended European Search Report dated Jan. 18, 2019 issued to the corresponding EP Application No. 16896865.9.
Office Action dated May 14, 2020 issued in counterpart Chinese Application No. 201680084147.0 with Machine Translation.
Avola et al., "Behavior of a Variable Geometry Turbine Wheel to High Cycle Fatigue", Proceedings of ASME Turbo Expo 2020, Turbomachinery Technical Conference and Exposition, GT2020-14302, pp. 1-11, (2020).

(56) References Cited

OTHER PUBLICATIONS

Huang et al., "An Investigation of the Flow Structures and Flow Control in a Variable Geometry Turbine", Proceeding of ASME Turbo Expo 2011, GT2011-46177, pp. 1-9, (2011).

Putra et al., "Investigation of Secondary Flow Behavior in a Radial Turbine Nozzle", Proceedings of ASME Turbo Expo 2006: Power for Land, Sear and Air, GT2006-90019, pp. 1-10, (2006).

Roumeas et al., "Aerodynamic Investigation of a Nozzle Clearance Effect on Radial Turbine Performace", Proceedings of ASME Turbo Expo 2012, GT2012-68835, pp. 1-9, (2012).

Simpson et al., "Numerical and Experimental Study of the Perforance Effects of Varying Vaneless Space and Vane Solidity in Radial Inflow Turrbine Stators" Proceedings of ASME Turbo Expo 2008: Power for Land, Sea and Air, GT2008-50261, pp. 1-11, (2008).

Tamaki et al., "The Effect of Clearance Flow of Variable Area Nozzles on Radial Turbine Performance", Proceedings of ASME Turbo Expo 2008: Power for Land, Sea and Air. GT2008-50461, pp. 1-11, (2008).

Tiseira et al., "Numerical Simulation of a Radiall Turbine at Off-Design Conditions in Presence of Choked Flow", Proceeding of ASME Turbo Expo 2020, Turbomachinery Technical Conference and Exposition, GT2020-14902, pp. 1-14, (2020).

\* cited by examiner

VARIABLE GEOMETRY TURBOCHARGER

TECHNICAL FIELD

The present disclosure relates to a variable geometry turbocharger.

BACKGROUND ART

A variable geometry turbocharger adjusts the flow of exhaust gas to a turbine rotor from a scroll flow passage inside a turbine casing to change the flow velocity and the pressure of exhaust gas to turbine blades, so as to enhance the supercharging effect.

Recently, improvement of response in a low-speed region of an engine is drawing attention due to tightening of exhaust gas regulations, for instance. Accordingly, there is a need for improvement of response of turbochargers. Upon acceleration of an engine, the opening degree of nozzle vanes in a variable nozzle mechanism is reduced to increase the exhaust gas pressure, thereby increasing the rotation speed of the turbine rotor. If the opening degree of the nozzle vanes is small, as shown in FIG. 21, a leakage flow from the clearance between the end surfaces of the nozzle vanes and the flow passage wall (hereinafter, referred to as a clearance flow) generates a great loss and causes a decrease in the efficiency, and thereby an increase of the rotation speed slows down.

On the other hand, if the clearance between the end surfaces of the nozzle vanes and the flow passage wall is reduced, the efficiency improves, but too small clearance may cause sticking of the nozzle vanes (nozzle vanes stick and fail to rotate). This is due to thermal deformation of peripheral components of the flow passage wall caused by exhaust gas.

Patent Document 1 discloses a variable nozzle mechanism for suppressing a clearance flow. In the variable mechanism disclosed in Patent Document 1, both end portions of each nozzle vane are formed to have a greater thickness than the middle portion, and the end surfaces of both end portions are formed parallel to the flow passage wall. Patent Document 1 discloses that, by increasing the dimension of the end surface of each nozzle vane in the thickness direction, it is possible to obtain a sufficient seal length and suppress a clearance flow.

CITATION LIST

Patent Literature

Patent Document 1: JPH11-229815A

SUMMARY

Problems to be Solved

Meanwhile, according to findings of the present inventors, in a variable geometry turbocharger, in a case where a nozzle vane of the variable nozzle mechanism is supported on one of the adjacent flow passage walls in a cantilever fashion, the nozzle vane may incline by a slight angle due to the hydrodynamic force of exhaust gas while the turbocharger is in operation, and the clearance flow may increase.

In this regard, Patent Document 1 does not disclose any findings for suppressing the clearance flow due to inclination of the nozzle vanes due to the hydrodynamic force of exhaust gas.

The present invention was made in view of the above described typical problem, and an object is to provide a variable turbocharger capable of suppressing a clearance flow upon inclination of the nozzle vanes.

Solution to the Problems (1) According to at least one embodiment of the present invention, a variable geometry turbocharger includes: a turbine rotor; and a variable nozzle mechanism for adjusting a flow of exhaust gas to the turbine rotor from a scroll flow passage formed on a radially outer side of the turbine rotor. The variable nozzle mechanism includes: a nozzle vane disposed in an exhaust gas flow passage for guiding the exhaust gas to the turbine rotor from the scroll flow passage; a support wall forming a flow passage wall on a first side of the exhaust gas flow passage with respect to an axial direction of the turbine rotor and supporting the nozzle vane rotatably in a cantilever fashion; and a non-support wall forming a flow passage wall on a second side of the exhaust gas flow passage with respect to the axial direction. Of an end surface of the nozzle vane on a side of the non-support wall, an edge portion on a side of a pressure surface includes a non-support-wall side linear portion formed to have a linear shape.

With the above variable geometry turbocharger (1), of the end surface on the side of the non-support wall of the nozzle vane, the edge portion of on the side of the pressure surface has a non-support-wall side linear portion formed to have a linear shape, and thus, when the nozzle vane is inclined by the hydrodynamic force, it is possible to reduce the clearance between the non-support wall and the end surface of the nozzle vane on the side of the non-support wall uniformly. Accordingly, it is possible to suppress a clearance flow that flows between the non-support wall and the end surface of the nozzle vane on the side of the non-support wall, and reduce loss due to the clearance flow. In particular, it is possible to improve the turbine performance at the time when the opening degree of the nozzle vane is small. Further, it is possible to ensure the clearance between the non-support wall and the end surface of the nozzle vane on the side of the non-support wall at the time when the nozzle vane is not inclined, and thus it is possible to suppress occurrence of sticking of the nozzle vane.

(2) In some embodiments, in the above variable geometry turbocharger (1), of the edge portion on the side of the pressure surface, the non-support-wall side linear portion is formed in a range including a position where a chord directional distance from a trailing edge of the nozzle vane is ¼ of a chord length of the nozzle vane.

With the above variable geometry turbocharger (2), the non-support-wall side linear portion is formed in a range including the side of the trailing edge where the blade thickness is small and the clearance flow is likely to raise problems, and thus it is possible to effectively suppress the clearance flow between the non-support wall and the end surface of the nozzle vane on the side of the non-support wall.

(3) In some embodiments, in the above variable geometry turbocharger (1) or (2), the non-support-wall side linear portion has a length which is not smaller than a half of a chord length of the nozzle vane.

According to the above variable geometry turbocharger (3), the non-support-wall side linear portion is formed in most portion of the edge portion on the side of the pressure surface in the chord direction, and thus it is possible to suppress the clearance flow between the non-support wall and the end surface of the nozzle vane on the side of the non-support wall effectively.

(4) In some embodiments, in the variable geometry turbocharger according to any one of the above (1) to (3), an end portion of the nozzle vane on a side of the non-support wall includes a non-support-wall side rib shaped portion protruding toward a pressure surface of the nozzle vane. The non-support-wall side linear portion is formed on the non-support-wall side rib shaped portion.

According to the above variable geometry turbocharger (4), by providing the non-support-wall side rib shaped portion so as to form the non-support-wall side linear portion, it is possible to obtain the effect to reduce the clearance flow with the non-support-wall side linear portion, while maintaining the shape having a high aerodynamic performance for the vane profile at the center position in the vane height direction of the nozzle vane.

(5) In some embodiments, in the variable geometry turbocharger according to any one of the above (1) to (3), an end portion of the nozzle vane on a side of the non-support wall includes a non-support-wall side inclined surface connecting the end surface of the nozzle vane on the side of the non-support wall and the pressure surface. The non-support-wall side inclined surface is inclined so that a distance from a suction surface of the nozzle vane reduces toward the non-support wall. The non-support-wall side linear portion is formed on a boundary position between the non-support-wall side inclined surface and the end surface on the side of the non-support wall.

According to the above variable geometry turbocharger (5), the non-support-wall side linear portion is formed on the boundary position between the non-support-wall side inclined surface and the end surface on the side of the non-support wall, and thus, when the nozzle vane is inclined by the hydrodynamic force, it is possible to reduce the clearance between the support wall and the end surface of the nozzle vane on the side of the support wall uniformly. Accordingly, it is possible to suppress a clearance flow that flows between the support wall and the end surface of the nozzle vane on the side of the support wall, and reduce loss due to the clearance flow. In particular, it is possible to improve the turbine performance at the time when the opening degree of the nozzle vane is small. Further, it is possible to ensure the clearance between the support wall and the end surface of the nozzle vane on the side of the support wall at the time when the nozzle vane is not inclined, and thus it is possible to suppress occurrence of sticking of the nozzle vane.

(6) In some embodiments, in the variable geometry turbocharger according to any one of the above (1) to (5), of an end surface of the nozzle vane on a side of the support wall, an edge portion on a side of a suction surface has a support-wall side linear portion formed to have a linear shape.

With the above variable geometry turbocharger (6), of the end surface of the nozzle vane on the side of the support wall, the edge portion of on the side of the suction surface has a support-wall side linear portion formed to have a linear shape, and thus, when the nozzle vane is inclined by the hydrodynamic force, it is possible to reduce the clearance between the support wall and the end surface of the nozzle vane on the side of the support wall uniformly. Accordingly, it is possible to suppress a clearance flow that flows between the support wall and the end surface of the nozzle vane on the side of the support wall, and reduce loss due to the clearance flow. In particular, it is possible to improve the turbine performance at the time when the opening degree of the nozzle vane is small. Further, it is possible to ensure the clearance between the support wall and the end surface of the nozzle vane on the side of the support wall at the time when the nozzle vane is not inclined, and thus it is possible to suppress occurrence of sticking of the nozzle vane.

(7) In some embodiments, in the above variable geometry turbocharger (6), the support-wall side linear portion and the non-support-wall side linear portion are formed to be parallel to each other.

According to the above (7), for the support wall and the non-support wall formed to be parallel to each other, it is possible to uniformly reduce both of the clearance between the non-support wall and the end surface of the nozzle vane on the side of the non-support wall and the clearance between the support wall and the end surface of the nozzle vane on the side of the support wall. Accordingly, it is possible to suppress both of the clearance flow that flows between the non-support wall and the end surface of the nozzle vane on the side of the non-support wall and the clearance flow that flows between the support wall and the end surface of the nozzle vane on the side of the support wall, and reduce loss due to the clearance flows effectively.

(8) In some embodiments, in the above variable geometry turbocharger (6) or (7), the support-wall side linear portion is formed in a range including a position where a chord directional distance from a trailing edge of the nozzle vane is ¼ of a chord length of the nozzle vane.

With the above variable geometry turbocharger (8), the support-wall side linear portion is formed in a range including the side of the trailing edge where the blade thickness is small and the clearance flow is likely to raise problems, and thus it is possible to effectively suppress the clearance flow between the support wall and the end surface of the nozzle vane on the side of the support wall effectively.

(9) In some embodiments, in the variable geometry turbocharger according to any one of the above (6) to (8), the support-wall side linear portion has a length which is not smaller than a half of a chord length of the nozzle vane.

According to the above variable geometry turbocharger, the support-wall side linear portion is formed in most portion of the edge portion on the side of the suction surface in the chord direction, and thus it is possible to suppress the clearance flow between the support wall and the end surface of the nozzle vane on the side of the support wall effectively.

(10) In some embodiments, in the variable geometry turbocharger according to any one of the above (6) to (9), the non-support-wall side linear portion is longer than the support-wall side linear portion.

According to the above variable geometry turbocharger (10), when the nozzle vane is inclined, it is possible to reduce loss due to the clearance flow effectively with a simple configuration, by enhancing the effect to reduce the clearance uniformly on the side of the non-support wall where the clearance flow is likely to raise problems.

(11) In some embodiments, in the variable geometry turbocharger according to any one of the above (6) to (10), the end portion of the nozzle vane on the side of the support wall includes a support-wall side rib shaped portion protruding toward a suction surface of the nozzle vane, and the support-wall side linear portion is formed on the support-wall side rib shaped portion.

According to the above variable geometry turbocharger (11), by providing the support-wall side rib shaped portion so as to form the support-wall side linear portion, it is possible to obtain the effect to reduce the clearance flow with the support-wall side linear portion, while maintaining the shape having a high aerodynamic performance for the vane profile at the center position in the vane height direction of the nozzle vane.

(12) In some embodiments, in the variable geometry turbocharger according to any one of the above (6) to (10), the end portion of the nozzle vane on the side of the support wall includes a support-wall side inclined surface connecting the end surface of the nozzle vane on the side of the support wall and the pressure surface. The support-wall side inclined surface is inclined so that a distance from the pressure surface of the nozzle vane reduces toward the support wall. The support-wall side linear portion is formed on a boundary position between the support-wall side inclined surface and the end surface on the side of the support wall.

According to the above variable geometry turbocharger (12), the support-wall side linear portion is formed on the boundary position between the support-wall side inclined surface and the end surface on the side of the support wall, and thus, when the nozzle vane is inclined by the hydrodynamic force, it is possible to reduce the clearance between the support wall and the end surface of the nozzle vane on the side of the support wall uniformly. Accordingly, it is possible to suppress a clearance flow that flows between the support wall and the end surface of the nozzle vane on the side of the support wall, and reduce loss due to the clearance flow. In particular, it is possible to improve the turbine performance at the time when the opening degree of the nozzle vane is small. Further, it is possible to ensure the clearance between the support wall and the end surface of the nozzle vane on the side of the support wall at the time when the nozzle vane is not inclined, and thus it is possible to suppress occurrence of sticking of the nozzle vane.

Advantageous Effects

According to at least one embodiment of the present invention, provided is a variable geometry turbocharger capable of suppressing a clearance flow upon inclination of nozzle vanes.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
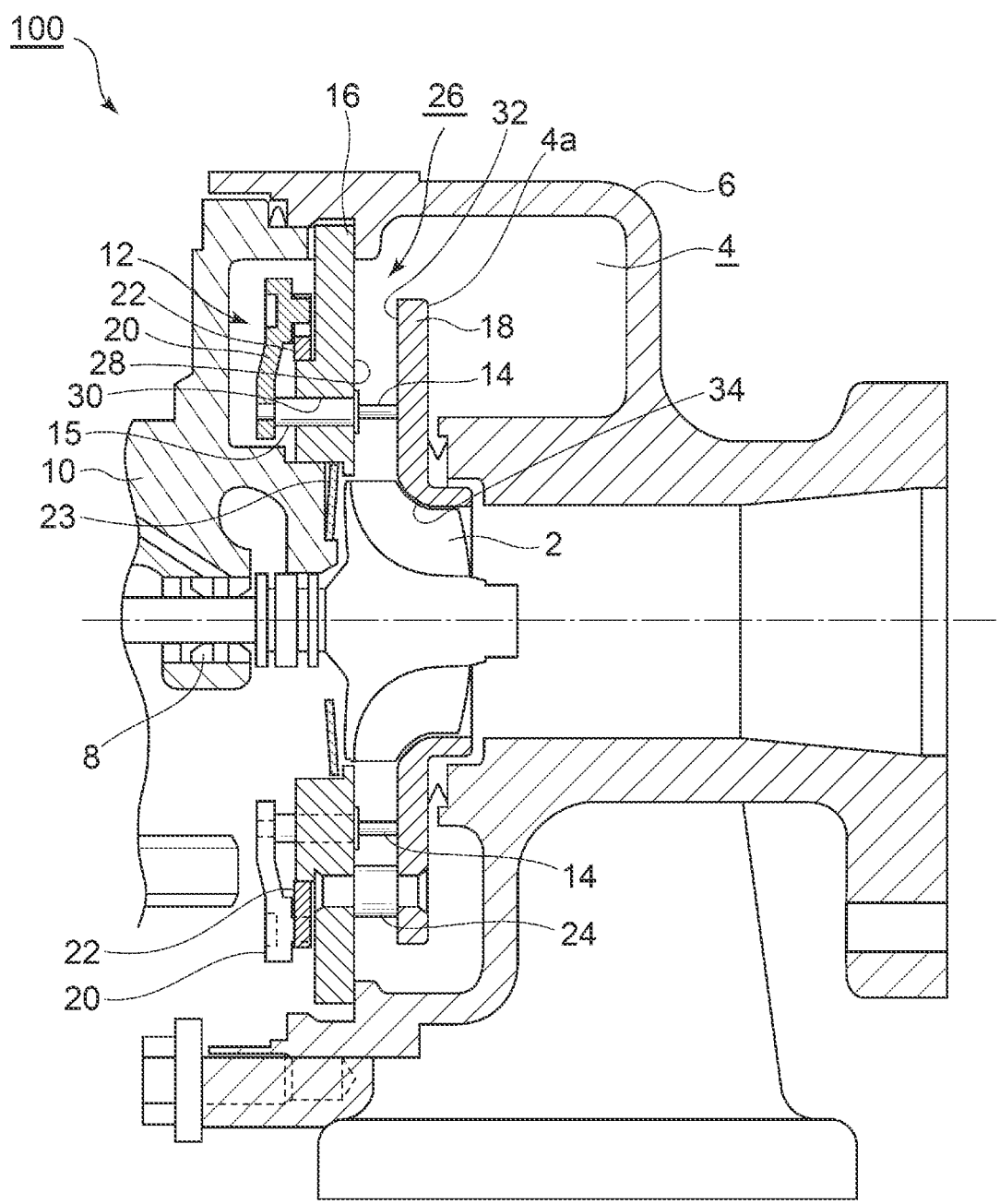
FIG. 1 is a schematic cross-sectional view of a variable geometry turbocharger 100 according to an embodiment of the present invention, taken along the rotational axis of the turbocharger 100.

FIG. 1 is a schematic cross-sectional view of a variable geometry turbocharger 100 according to an embodiment of the present invention, taken along the rotational axis of the variable geometry turbocharger 100.

The variable geometry turbocharger 100 includes a turbine rotor 2 disposed coaxially with a non-depicted compressor, a turbine housing 6 that houses the turbine rotor 2 and forms a scroll flow passage on the radially outer side of the turbine rotor 2, a bearing housing 10 housing a bearing 8 supporting the turbine rotor 2 rotatably and being coupled to the turbine housing 6, and a variable nozzle mechanism 12 disposed between the turbine housing 6 and the bearing housing 10, for adjusting the flow of exhaust gas from the scroll flow passage 4 to the turbine rotor 2.

Hereinafter, unless otherwise stated, the axial direction of the turbine rotor 2 is referred to as merely "axial direction", the radial direction of the turbine rotor 2 is referred to as merely "radial direction", and the circumferential direction of the turbine rotor 2 is referred to as merely "circumferential direction".

The variable nozzle mechanism 12 includes a plurality of nozzle vanes 14, a support wall (nozzle mount) 16, a non-support wall (nozzle plate) 18, a plurality of lever plates 20, a drive ring 22, and a plurality of nozzle supports 24.

The plurality of nozzle vanes 14 are disposed at intervals in the circumferential direction, in an exhaust gas flow passage 26 for introducing exhaust gas from the scroll flow passage 4 to the turbine rotor 2.

The support wall 16 is an annular plate member disposed on the radially outer side of the turbine rotor 2, and forms a flow passage wall 28 on one side (in the depicted embodiment, the side of the bearing housing 10) of the exhaust gas flow passage 26 with respect to the axial direction. The support wall 16 is provided with a plurality of support holes 30 (through holes) for rotatably supporting the respective shaft portions 15 of the plurality of nozzle vanes 14 in a cantilever fashion.

The non-support wall 18 is an annular plate disposed on the radially outer side of the turbine rotor 2 so as to face the support wall 16. The non-support wall 18 forms a flow passage wall 32 on the other side (in the depicted embodiment, the opposite side to the bearing housing 10) of the exhaust gas flow passage 26 with respect to the axial direction, and does not support any of the nozzle vanes 14. Further, the non-support wall 18 forms, on the downstream side of the flow passage wall 32, a shroud wall 34 facing the tip-side ends of the blades of the turbine rotor 2 via a gap. The support wall 16 and the non-support wall 18 are coupled by a plurality of nozzle supports 24.

A back plate 23 is disposed between the back face of the turbine rotor 2 and the bearing housing 10, so that exhaust gas flowing from the exhaust gas flow passage 26 to the turbine rotor 2 does not leak toward the back side of the support wall 16 (opposite to the exhaust gas flow passage 26) through the radially inner side of the support wall 16. The back plate 23 is in contact with the support wall 16 at one end side in the axial direction, and is in contact with the bearing housing 10 at the other end side in the axial direction.

In the variable nozzle mechanism 12 described above, the drive ring 22 is rotary driven by a driving force transmitted from a non-depicted actuator. When the drive ring 22 rotates, the lever plates 20 being in engagement with the drive ring 22 rotate the shaft portions 15 of the nozzle vanes 14, and as a result, the nozzle vanes 14 rotate and the vane angles of the nozzle vanes 14 change, thereby adjusting the flow of exhaust gas from the scroll flow passage 4 to the turbine rotor 2.

Figure 2:
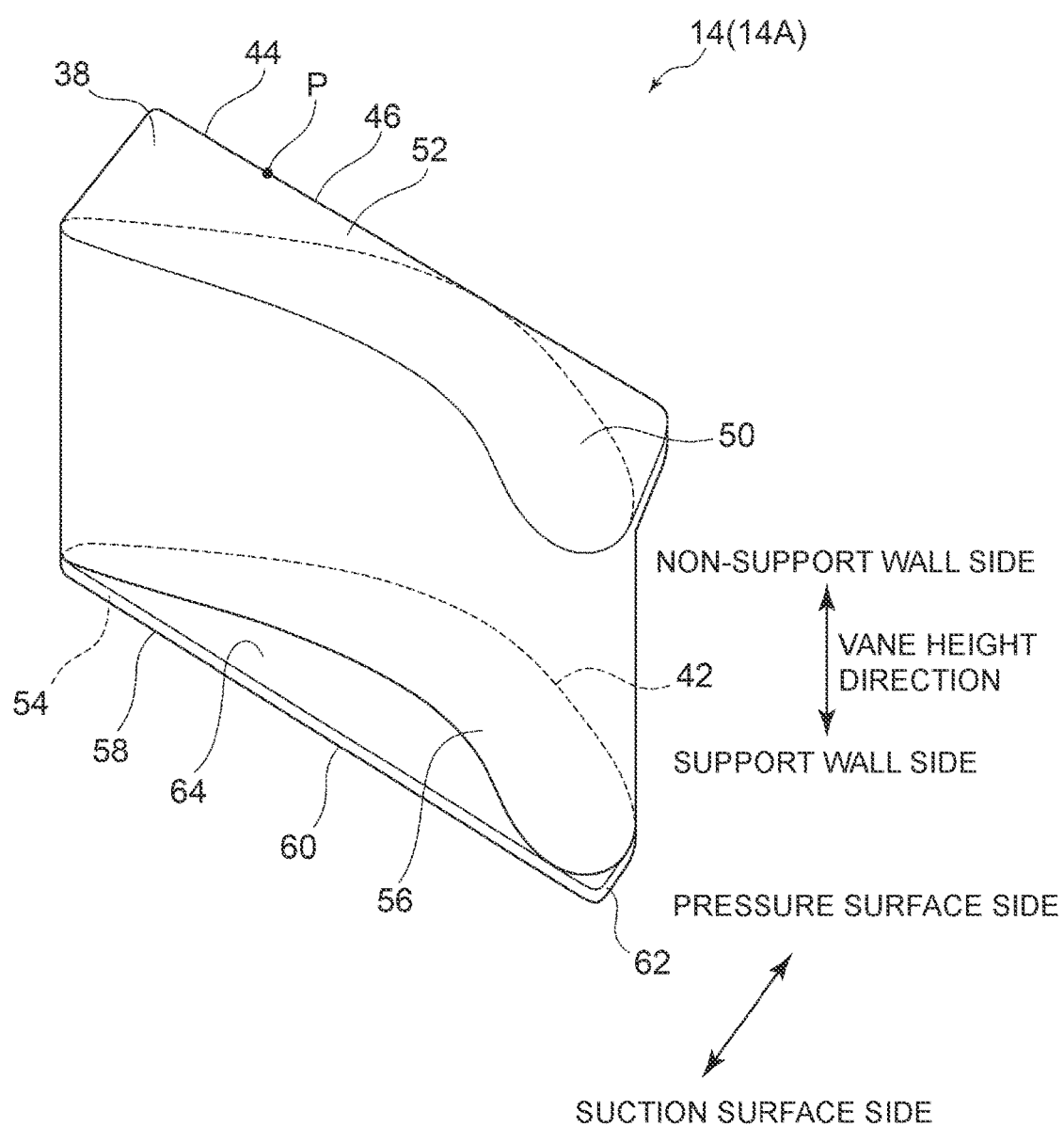
FIG. 2 is a schematic perspective view of a nozzle vane 14 (14A) according to an embodiment.
Figure 3:
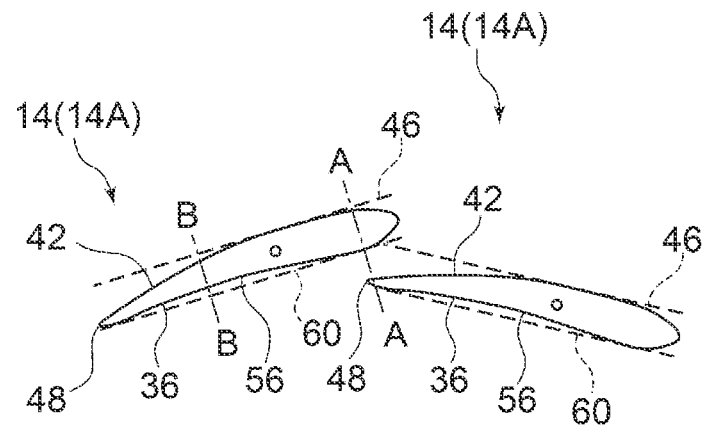
FIG. 3 is a diagram showing a vane profile 36 at a middle position in the vane height direction of the nozzle vane 14 (14A).
Figure 4:
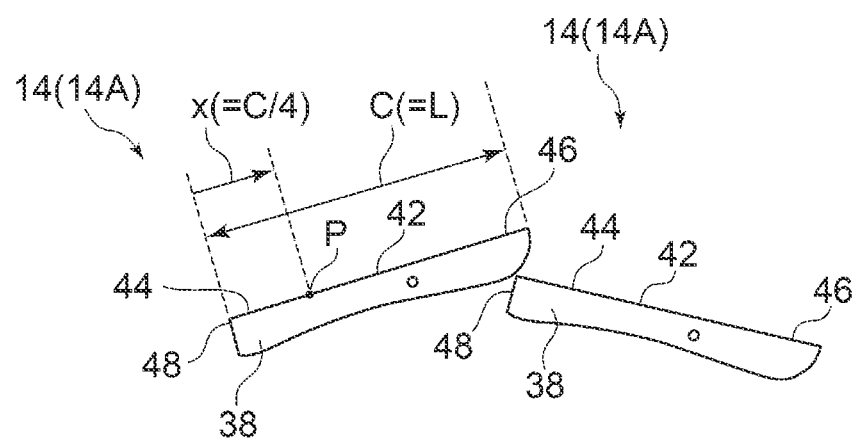
FIG. 4 is a diagram showing the shape of the end surface 38 of the nozzle vane 14 (14A), on the side of a non-support wall 18.
Figure 5:
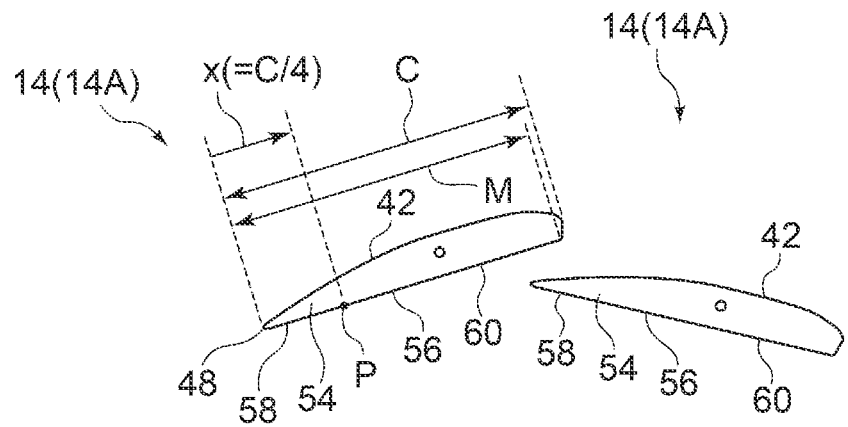
FIG. 5 is a diagram showing the shape of the end surface 54 of the nozzle vane 14 (14A), on the side of a support wall 16.
Figure 6:
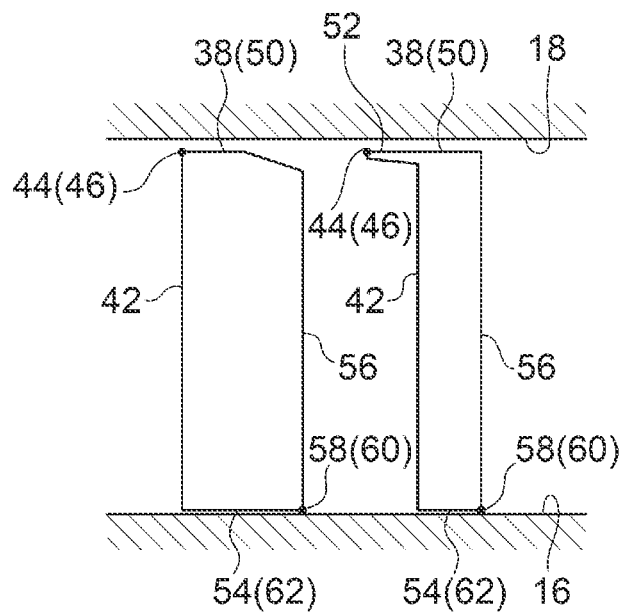
FIG. 6 is a cross-sectional view taken along line A-A in FIG. 3, showing a state where the nozzle vane 14 (14A) is not inclined by the hydrodynamic force.
Figure 7:
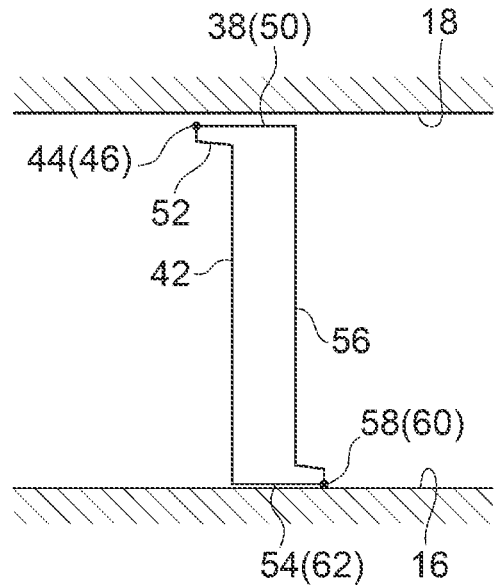
FIG. 7 is a cross-sectional view taken along line B-B in FIG. 3, showing a state where the nozzle vane 14 (14A) is not inclined by the hydrodynamic force.
Figure 8:
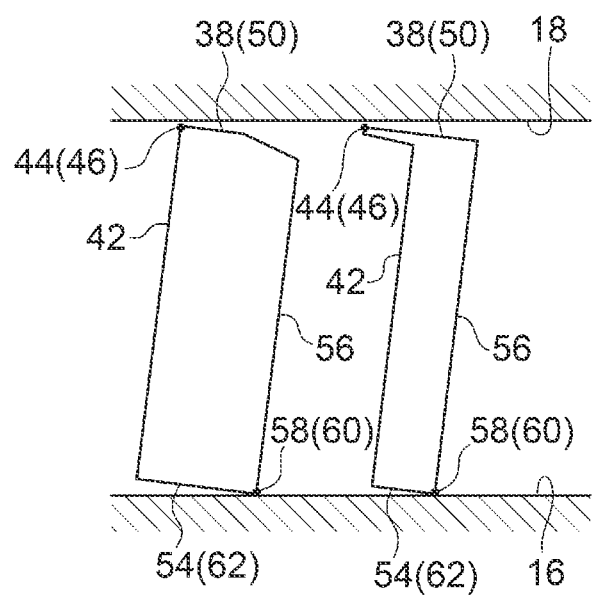
FIG. 8 is a cross-sectional view taken along line A-A in FIG. 3, showing a state where the nozzle vane 14 (14A) is inclined by the hydrodynamic force.
Figure 9:
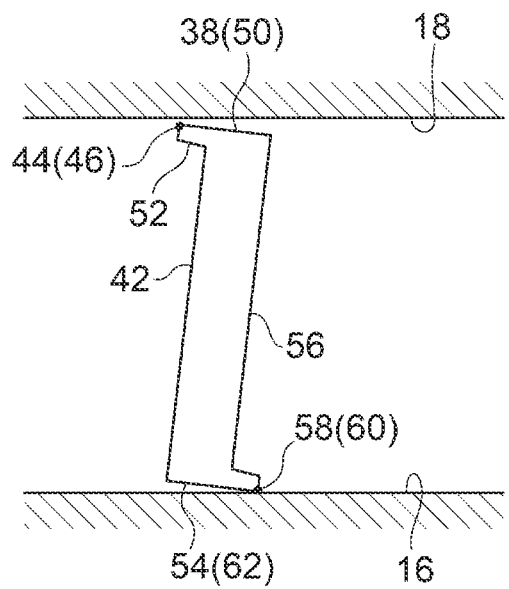
FIG. 9 is a cross-sectional view taken along line B-B in FIG. 3, showing a state where the nozzle vane 14 (14A) is inclined by the hydrodynamic force.

FIG. 2 is a schematic perspective view of a nozzle vane 14 (14A) according to an embodiment. FIG. 3 is a diagram showing a vane profile 36 at a middle position in the vane height direction of the nozzle vane 14 (14A). FIG. 4 is a diagram showing the shape of the end surface 38 of the nozzle vane 14 (14A) on the side of a non-support wall 18. FIG. 5 is a diagram showing the shape of the end surface 54 of the nozzle vane 14 (14A) on the side of a support wall 16. In FIGS. 2 and 5, the shaft portions 15 of the nozzle vanes 14 are not depicted for the sake of convenience. FIG. 6 is a cross-sectional view taken along line A-A in FIG. 3, showing a state where the nozzle vane 14 (14A) is not inclined by the hydrodynamic force. FIG. 7 is a cross-sectional view taken along line B-B in FIG. 3, showing a state where the nozzle vane 14 (14A) is not inclined by the hydrodynamic force. FIG. 8 is a cross-sectional view taken along line A-A in FIG. 3, showing a state where the nozzle vane 14 (14A) is inclined by the hydrodynamic force. FIG. 9 is a cross-sectional view taken along line B-B in FIG. 3, showing a state where the nozzle vane 14 (14A) is inclined by the hydrodynamic force.

In an embodiment, as shown in FIGS. 2, 4, 6, and 7 for instance, of the end surface 38 of the nozzle vane 14 (14A) on the side of the non-support wall 18, the edge portion 44 on the side of the pressure surface 42 has a non-support-wall side linear portion 46 formed to have a linear shape.

With the above configuration, of the end surface 38 of the nozzle vane 14 (14A) on the side of the non-support wall 18, the edge portion 44 of on the side of the pressure surface 42 has a non-support-wall side linear portion 46 formed to have a linear shape, and thus, when the nozzle vane 14 is inclined by the hydrodynamic force (see FIGS. 8 and 9), it is possible to reduce the clearance between the non-support wall 18 and the end surface 38 of the nozzle vane 14 on the side of the non-support wall 18 uniformly over the entire length of the non-support-wall side linear portion 46. Accordingly, it is possible to suppress a clearance flow that flows between the non-support wall 18 and the end surface 38 of the nozzle vane 14 on the side of the non-support wall 18, and reduce loss due to the clearance flow. In particular, it is possible to improve the turbine performance at the time when the opening degree of the nozzle vane 14 is small. Further, as shown in FIGS. 6 and 7, it is possible to ensure the clearance between the non-support wall 18 and the end surface 38 of the nozzle vane 14 on the side of the non-support wall 18 at the time when the nozzle vane 14 is not inclined, and thus it is possible to suppress occurrence of sticking of the nozzle vane 14.

In an embodiment, as shown in FIG. 4 for instance, the non-support-wall side linear portion 46 is formed in a range including the position P at which the chord directional distance x from the trailing edge 48 of the nozzle vane 14 is ¼ of the chord length C of the nozzle vane 14, of the edge portion 44 on the side of the pressure surface 42. In the depicted embodiment, the non-support-wall side linear portion 46 is formed over the entire length of the edge portion 44 on the side of the pressure surface 42.

With the above configuration, the non-support-wall side linear portion 46 is formed in a range including the side of the trailing edge 48 where the blade thickness is small and the clearance flow is likely to raise problems, and thus it is possible to suppress the clearance flow between the non-support wall 18 and the end surface 38 of the nozzle vane 14 on the side of the non-support wall 18 effectively.

In an embodiment, as shown in FIG. 4 for instance, the length L of the non-support-wall side linear portion 46 is not shorter than a half of the chord length C (vane length) of the nozzle vane 14. In the depicted illustrative embodiment, the length L is equal to the chord length C.

With the above configuration, the non-support-wall side linear portion 46 is formed in most portion of the edge portion 44 on the side of the pressure surface 42 in the chord direction, and thus it is possible to suppress the clearance flow between the non-support wall 18 and the end surface 38 of the nozzle vane 14 on the side of the non-support wall 18 effectively.

In an embodiment, as shown in FIGS. 2, 6, and 7 for instance, the end portion 50 of the nozzle vane 14 on the side of the non-support wall 18 includes a non-support-wall side rib shaped portion 52 protruding toward the pressure surface 42 of the nozzle vane 14, and the non-support-wall side linear portion 46 is formed on the tip of the non-support-wall side rib shaped portion 52.

With the above configuration, by providing the non-support-wall side rib shaped portion 52 so as to form the non-support-wall side linear portion 46, it is possible to obtain the effect to reduce the clearance flow with the non-support-wall side linear portion 46, while maintaining the shape having a high aerodynamic performance for the vane profile at the center position in the vane height direction of the nozzle vane 14 as depicted in FIG. 3.

In an embodiment, as shown in FIGS. 2 and 3 for instance, in a view taken in the direction of the rotational axis of the nozzle vane 14, the non-support-wall side rib shaped portion 52 is disposed so as to protrude so that the non-support-wall side linear portion 46 extends on the tangent of the nozzle vane 14 to the pressure surface 42.

With the above configuration, it is possible to obtain the effect to reduce the clearance flow with the non-support-wall side linear portion 46 with a simple configuration, without excessively increasing the size of the non-support-wall side rib shaped portion 52.

In an embodiment, as shown in FIGS. 2, 5 to 7, of the end surface 54 of the nozzle vane 14 on the side of the support wall 16, the edge portion 58 on the side of the suction surface 56 has a support-wall side linear portion 60 formed to have a linear shape.

With the above configuration, of the end surface 54 of the nozzle vane 14 on the side of the support wall 16, the edge portion 58 on the side of the suction surface 56 is formed to have a linear shape, and thus, when the nozzle vane 14 is inclined by the hydrodynamic force (see FIGS. 8 and 9), it is possible to reduce the clearance between the support wall 16 and the end surface 54 of the nozzle vane 14 on the side of the support wall 16 uniformly. Accordingly, it is possible to suppress a clearance flow that flows between the support wall 16 and the end surface 54 of the nozzle vane 14 on the side of the support wall 16, and reduce loss due to the clearance flow. In particular, it is possible to improve the turbine performance at the time when the opening degree of the nozzle vane 14 is small. Further, as shown in FIGS. 6 and 7, it is possible to ensure the clearance between the support wall 16 and the end surface 54 of the nozzle vane 14 on the side of the support wall 16 at the time when the nozzle vane 14 is not inclined, and thus it is possible to suppress occurrence of sticking of the nozzle vane 14.

In an illustrative embodiment shown in FIGS. 8 and 9, when the nozzle vane 14 is inclined by the hydrodynamic force, the support-wall side linear portion 60 makes contact with the support wall 16 before the non-support-wall side linear portion 46 makes contact with the non-support wall 18. Thus, with the distance between the rotation center of the nozzle vane 14 and the support-wall side linear portion 60, it is possible to set the axial directional moving amount of the entire nozzle vane 14 accompanying inclination of the nozzle vane 14. Further, with the distance between the rotation center of the nozzle vane 14 and the non-support-wall side linear portion 46, it is possible to set the clearance amount between the non-support wall 18 and the end surface 54 of the nozzle vane 14 on the side of the non-support wall 18 at the time when the nozzle vane 14 is inclined.

In an embodiment, as shown in FIG. 2 for instance, the support-wall side linear portion 60 and the non-support-wall side linear portion 46 are formed parallel to each other.

With the above configuration, as shown in FIGS. 8 and 9 for instance, for the support wall 16 and the non-support wall 18 formed to be parallel to each other, it is possible to reduce both of the clearance between the non-support wall 18 and the end surface 38 on the side of the non-support wall 18 of the nozzle vane 14 and the clearance between the support wall 16 and the end surface 54 of the nozzle vane 14 on the side of the support wall 16 uniformly. Accordingly, it is possible to suppress both of the clearance flow that flows between the non-support wall 18 and the end surface 38 of the nozzle vane 14 on the side of the non-support wall 18 and the clearance flow that flows between the support wall 16 and the end surface 54 of the nozzle vane 14 on the side of the support wall 16, and reduce loss due to the clearance flow effectively.

In an embodiment, as shown in FIG. 5 for instance, the support-wall side linear portion 60 is formed in a range including the position P at which the chord directional distance x from the trailing edge 48 of the nozzle vane 14 is ¼ of the chord length C of the nozzle vane 14.

With the above configuration, the support-wall side linear portion 60 is formed on the side of the trailing edge 48 where the blade thickness is small and the clearance flow is likely to raise problems, and thus it is possible to suppress the clearance flow between the support wall 16 and the end surface 54 of the nozzle vane 14 on the side of the support wall 16 effectively.

In an embodiment, as shown in FIG. 5 for instance, the length M of the support-wall side linear portion 60 is not shorter than a half of the chord length C (vane length) of the nozzle vane 14. In the depicted illustrative embodiment, 0.8 C<M<C is satisfied.

With the above configuration, the support-wall side linear portion 60 is formed in most portion of the edge portion 58 on the side of the suction surface 56 in the chord direction, and thus it is possible to suppress the clearance flow between the support wall 16 and the end surface 54 of the nozzle vane 14 on the side of the support wall 16 effectively.

In an embodiment, as shown in FIGS. 4 and 5 for instance, the length L of the non-support-wall side linear portion 46 is greater than the length M of the support-wall side linear portion 60.

With the above configuration, when the nozzle vanes 14 are inclined, it is possible to reduce loss due to the clearance flow effectively with a simple configuration, by enhancing the effect to reduce the clearance uniformly on the side of the non-support wall 18 where the clearance flow is likely to raise problems.

In an embodiment, as shown in FIG. 2 for instance, the end portion 62 of the nozzle vane 14 on the side of the support wall 16 includes a support-wall side rib shaped portion 64 protruding toward the suction surface 56 of the nozzle vane 14, and the support-wall side linear portion 60 is formed on the tip of the support-wall side rib shaped portion 64.

With the above configuration, by providing the support-wall side rib shaped portion 64 so as to form the support-wall side linear portion 60, it is possible to obtain the effect to reduce the clearance flow with the support-wall side linear portion 60, while maintaining the shape having a high aerodynamic performance for the vane profile at the center position in the vane height direction of the nozzle vane 14 as depicted in FIG. 3.

In an embodiment, as shown in FIGS. 2 and 3 for instance, in a view taken in the direction of the rotational axis of the nozzle vane 14, the support-wall side rib shaped portion 64 is disposed so as to protrude so that the support-wall side linear portion 60 extends on the tangent of the nozzle vane 14 to the suction surface 56.

With the above configuration, it is possible to obtain the effect to reduce the clearance flow with the support-wall side linear portion 60 with a simple configuration, without excessively increasing the size of the support-wall side rib shaped portion 64.

Figure 10:
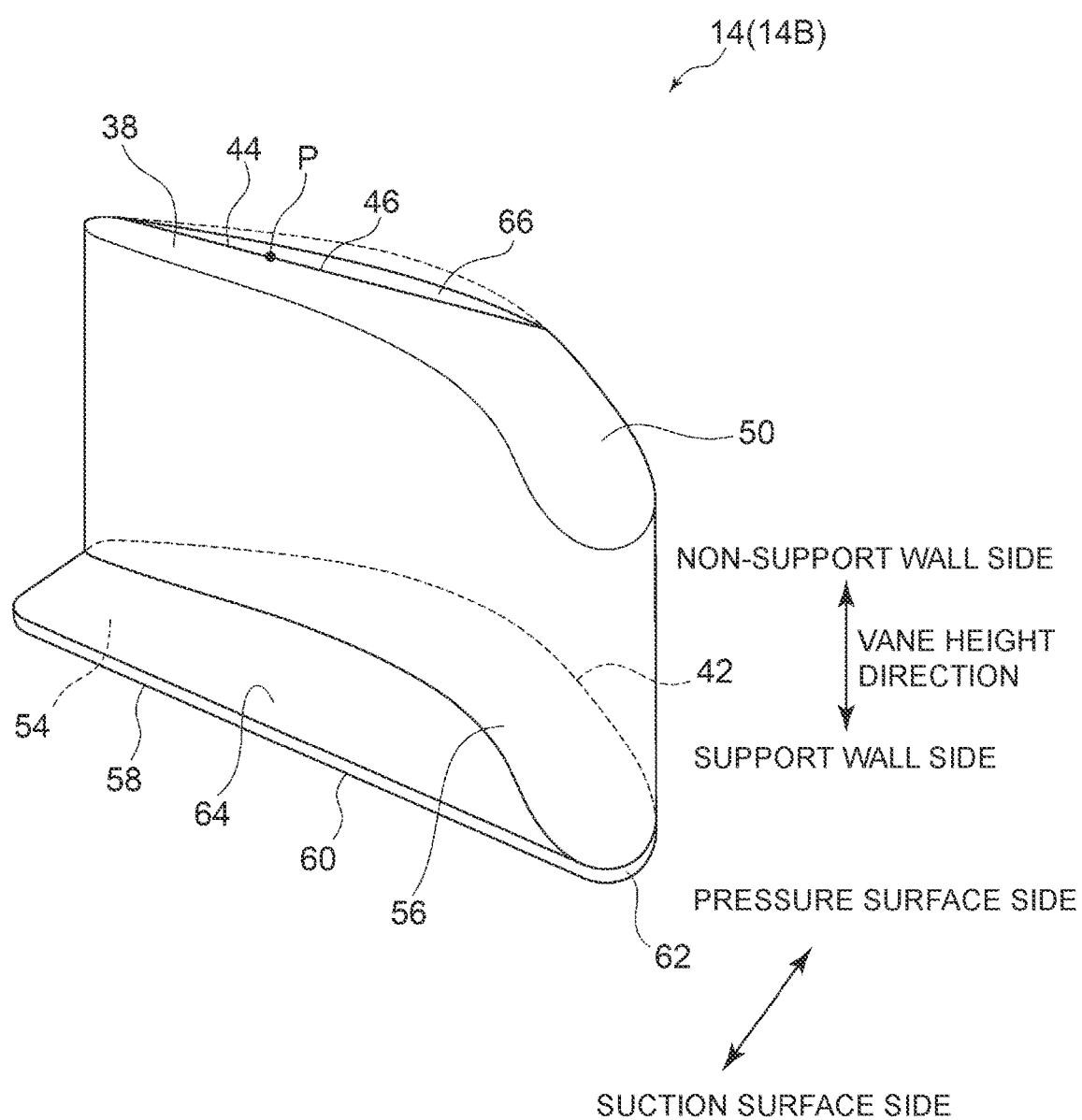
FIG. 10 is a schematic perspective view of a nozzle vane 14 (14B) according to an embodiment.
Figure 11:
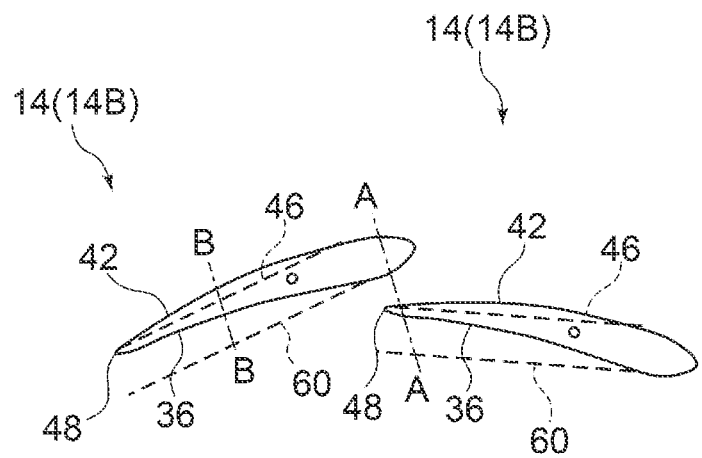
FIG. 11 is a diagram showing a vane profile 36 at a middle position in the vane height direction of the nozzle vane 14 (14B).
Figure 12:
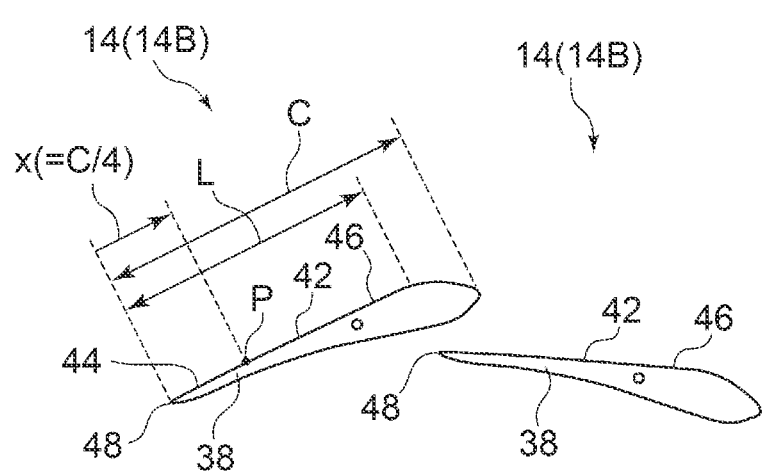
FIG. 12 is a diagram showing the shape of the end surface 38 of the nozzle vane 14 (14B), on the side of a non-support wall 18.
Figure 13:
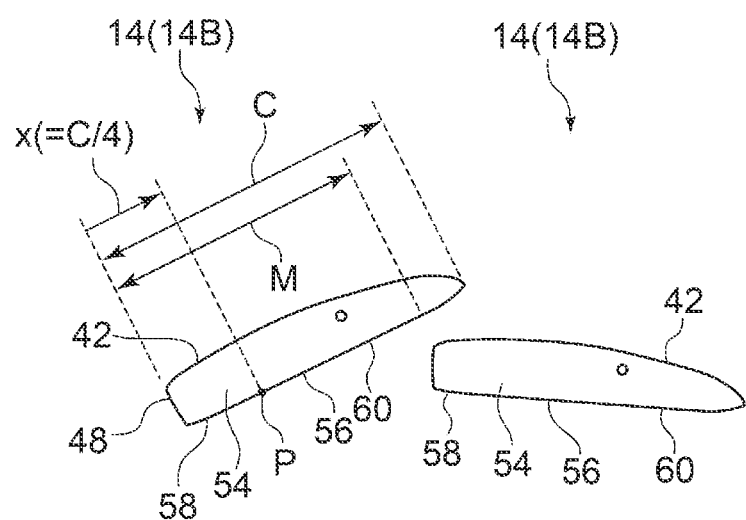
FIG. 13 is a diagram showing the shape of the end surface 54 of the nozzle vane 14 (14B), on the side of a support wall 16.
Figure 14:
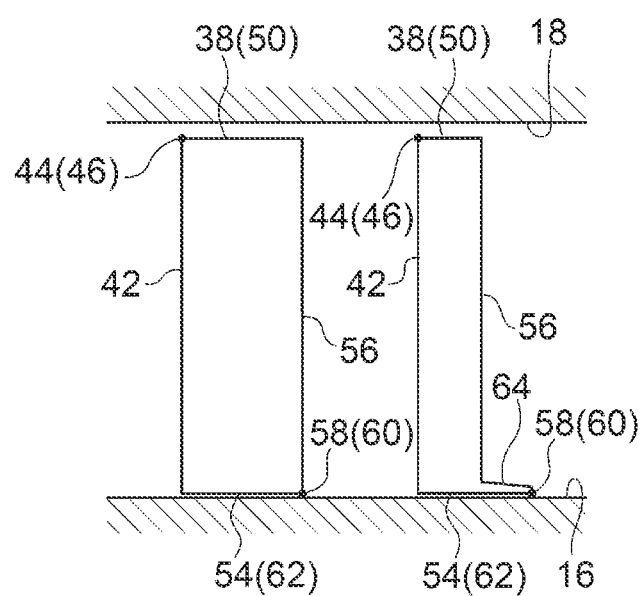
FIG. 14 is a cross-sectional view taken along line A-A in FIG. 11, showing a state where the nozzle vane 14 (14B) is not inclined by the hydrodynamic force.
Figure 15:
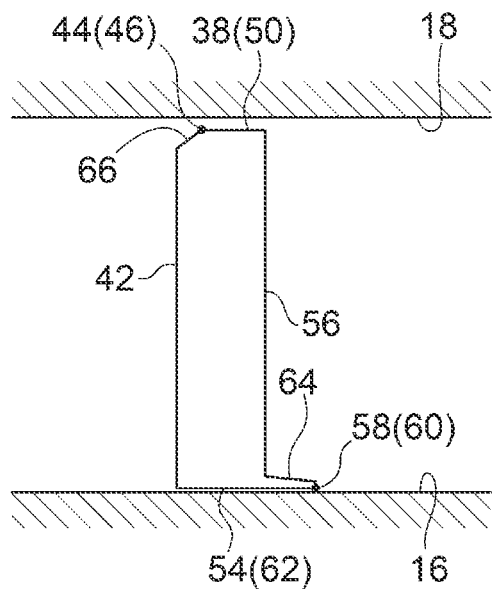
FIG. 15 is a cross-sectional view taken along line B-B in FIG. 11, showing a state where the nozzle vane 14 (14B) is not inclined by the hydrodynamic force.
Figure 16:
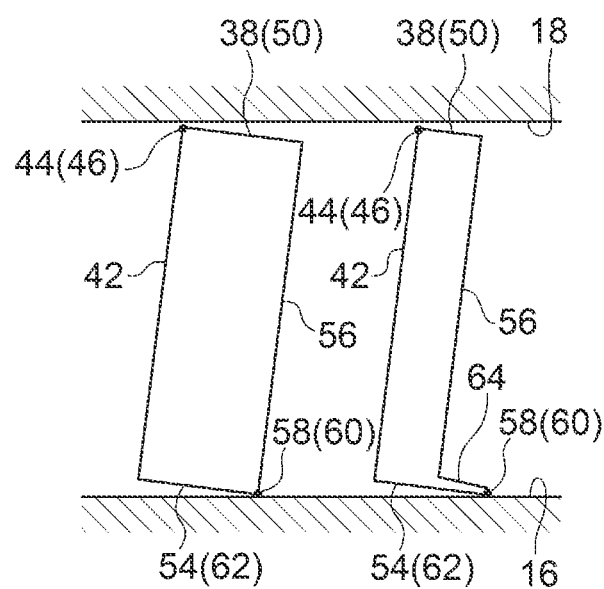
FIG. 16 is a cross-sectional view taken along line A-A in FIG. 11, showing a state where the nozzle vane 14 (14B) is inclined by the hydrodynamic force.
Figure 17:
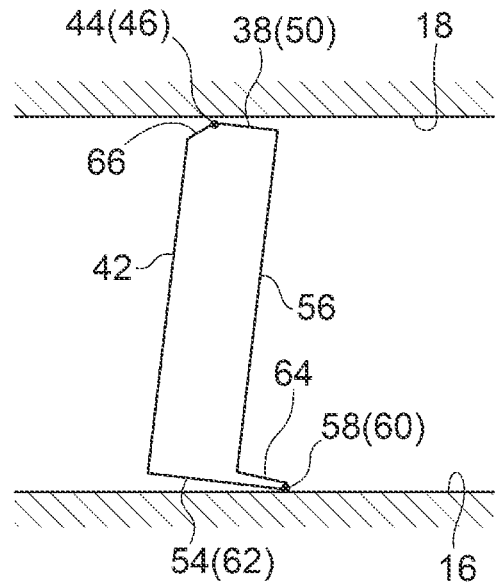
FIG. 17 is a cross-sectional view taken along line B-B in FIG. 11, showing a state where the nozzle vane 14 (14B) is inclined by the hydrodynamic force.

FIG. 10 is a schematic perspective view of a nozzle vane 14 (14B) according to an embodiment. FIG. 11 is a diagram showing a vane profile 36 at a middle position in the vane height direction of the nozzle vane 14 (14B). FIG. 12 is a diagram showing the shape of the end surface 38 of the nozzle vane 14 (14B) on the side of a non-support wall 18. FIG. 13 is a diagram showing the shape of the end surface 54 of the nozzle vane 14 (14B) on the side of a support wall 16. FIG. 14 is a cross-sectional view taken along line A-A in FIG. 11, showing a state where the nozzle vane 14 (14B) is not inclined by the hydrodynamic force. FIG. 15 is a cross-sectional view taken along line B-B in FIG. 11, showing a state where the nozzle vane 14 (14B) is not inclined by the hydrodynamic force. FIG. 16 is a cross-sectional view taken along line A-A in FIG. 11, showing a state where the nozzle vane 14 (14B) is inclined by the hydrodynamic force. FIG. 17 is a cross-sectional view taken along line B-B in FIG. 11, showing a state where the nozzle vane 14 (14B) is inclined by the hydrodynamic force.

In an embodiment, as shown in FIGS. 10 and 15, the end portion 50 of the nozzle vane 14 on the side of the non-support wall 18 includes a non-support-wall side inclined surface 66 connecting the pressure surface 42 and the end surface 38 of the nozzle vane 14 on the side of the non-support wall 18. The non-support-wall side inclined surface 66 is inclined so that the distance from the suction surface 56 of the nozzle vane 14 decreases toward the non-support wall 18. The non-support-wall side linear portion 46 is formed on the boundary position between the non-support-wall side inclined surface 66 and the end surface 38 on the side of the non-support wall 18. In the depicted embodiment, the non-support-wall side inclined surface 66 is a flat surface.

With the above configuration, the non-support-wall side linear portion 46 is formed on the boundary position between the non-support-wall side inclined surface 66 and the end surface 38 on the side of the non-support wall 18, and thus, when the nozzle vane 14 is inclined by the hydrodynamic force as depicted in FIGS. 16 and 17, it is possible to reduce the clearance between the support wall 16 and the end surface 54 of the nozzle vane 14 on the side of the support wall 16 uniformly. Accordingly, it is possible to suppress a clearance flow that flows between the support wall 16 and the end surface 54 on the side of the support wall 16 of the nozzle vane 14, and reduce loss due to the clearance flow. In particular, it is possible to improve the turbine performance at the time when the opening degree of the nozzle vane 14 is small. Further, as shown in FIGS. 16 and 17, it is possible to ensure the clearance between the support wall 16 and the end surface 54 of the nozzle vane 14 on the side of the support wall 16 at the time when the nozzle vane 14 is not inclined, and thus it is possible to suppress occurrence of sticking of the nozzle vane 14.

In an embodiment, as shown in FIG. 12 for instance, the non-support-wall side linear portion 46 is formed in a range including the position P at which the chord directional distance x from the trailing edge 48 of the nozzle vane 14 is ¼ of the chord length C of the nozzle vane 14, of the edge portion 44 on the side of the pressure surface 42. In the depicted embodiment, the non-support-wall side linear portion 46 is formed over the entire length of the edge portion 44 on the side of the pressure surface 42.

With the above configuration, similarly to the above description of FIG. 4, it is possible to suppress the clearance flow between the non-support wall 18 and the end surface 38 of the nozzle vane 14 on the side of the non-support wall 18 effectively on the side of the trailing edge 48.

In an embodiment, as shown in FIG. 12 for instance, the length L of the non-support-wall side linear portion 46 is not shorter than a half of the chord length C (vane length) of the nozzle vane 14. In the depicted illustrative embodiment, 0.8 C<M<C is satisfied.

With the above configuration, the non-support-wall side linear portion 46 is formed in most portion of the edge portion 44 on the side of the pressure surface 42 in the chord direction, and thus it is possible to suppress the clearance flow between the non-support wall 18 and the end surface 38 of the nozzle vane 14 on the side of the non-support wall 18 effectively.

In an embodiment, as shown in FIGS. 10, 13 to 15 for instance, of the end surface 54 of the nozzle vane 14 on the side of the support wall 16, the edge portion 58 on the side of the suction surface 56 has a support-wall side linear portion 60 formed to have a linear shape.

With the above configuration, of the end surface 54 of the nozzle vane 14 on the side of the support wall 16, the edge portion 58 of on the side of the suction surface 56 is formed to have a linear shape, and thus, when the nozzle vane 14 is inclined by the hydrodynamic force as depicted in FIGS. 16 and 17, it is possible to reduce the clearance between the support wall 16 and the end surface 54 of the nozzle vane 14 on the side of the support wall 16 uniformly. Accordingly, it is possible to suppress a clearance flow that flows between the support wall 16 and the end surface 54 of the nozzle vane 14 on the side of the support wall 16, and reduce loss due to the clearance flow. In particular, it is possible to improve the turbine performance at the time when the opening degree of the nozzle vane 14 is small. Further, as shown in FIGS. 14 and 15, it is possible to ensure the clearance between the support wall 16 and the end surface 54 of the nozzle vane 14 on the side of the support wall 16 at the time when the nozzle vane 14 is not inclined, and thus it is possible to suppress occurrence of sticking of the nozzle vane 14.

In an embodiment, as shown in FIG. 10 for instance, the support-wall side linear portion 60 and the non-support-wall side linear portion 46 are formed parallel to each other.

With the above configuration, as shown in FIGS. 16 and 17 for instance, when the nozzle vane 14 is inclined, for the support wall 16 and the non-support wall 18 formed to be parallel to each other, it is possible to uniformly reduce both of the clearance between the non-support wall 18 and the end surface 38 of the nozzle vane 14 on the side of the non-support wall 18 and the clearance between the support wall 16 and the end surface 54 of the nozzle vane 14 on the side of the support wall 16. Accordingly, it is possible to suppress both of the clearance flow that flows between the non-support wall 18 and the end surface 38 of the nozzle vane 14 on the side of the non-support wall 18 and the clearance flow that flows between the support wall 16 and the end surface 54 of the nozzle vane 14 on the side of the support wall 16, and reduce loss due to the clearance flows effectively.

In an embodiment, as shown in FIG. 13 for instance, the support-wall side linear portion 60 is formed in a range including the position P at which the chord directional distance x from the trailing edge 48 of the nozzle vane 14 is ¼ of the chord length C of the nozzle vane 14.

With the above configuration, similarly to the above description of FIG. 5, it is possible to suppress the clearance flow between the support wall 16 and the end surface 54 of the nozzle vane 14 on the side of the support wall 16 effectively on the side of the trailing edge 48.

In an embodiment, as shown in FIG. 13 for instance, the length M of the support-wall side linear portion 60 is not shorter than a half of the chord length C (vane length) of the nozzle vane 14.

With the above configuration, the support-wall side linear portion 60 is formed in most portion of the edge portion 58 on the side of the suction surface 56 in the chord direction, and thus it is possible to suppress the clearance flow between the support wall 16 and the end surface 54 of the nozzle vane 14 on the side of the support wall 16 effectively.

In an embodiment, as shown in FIGS. 12 and 13 for instance, the length L of the non-support-wall side linear portion 46 is greater than the length M of the support-wall side linear portion 60.

With the above configuration, when the nozzle vane 14 is inclined, it is possible to reduce loss due to the clearance flow effectively with a simple configuration, by enhancing the effect to reduce the clearance uniformly on the side of the non-support wall 18 where the clearance flow is likely to raise problems.

In an embodiment, as shown in FIGS. 10, 14, and 15 for instance, the end portion 62 of the nozzle vane 14 on the side of the support wall 16 includes a support-wall side rib shaped portion 64 protruding toward the suction surface 56 of the nozzle vane 14, and the support-wall side linear portion 60 is formed on the tip of the support-wall side rib shaped portion 64.

With the above configuration, by providing the support-wall side rib shaped portion 64 so as to form the support-wall side linear portion 60, it is possible to obtain the effect to reduce the clearance flow with the support-wall side linear portion 60, while maintaining the shape having a high aerodynamic performance for the vane profile at the center position in the vane height direction of the nozzle vane 14 as depicted in FIG. 11.

Embodiments of the present invention were described in detail above, but the present invention is not limited thereto, and various amendments and modifications may be implemented.

Figure 18:
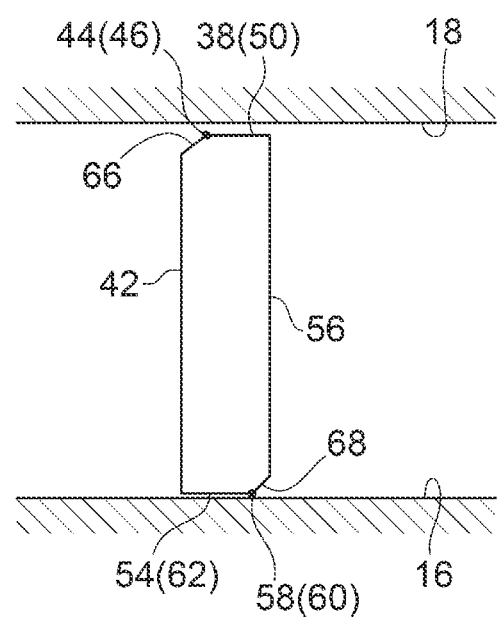
FIG. 18 is a diagram for describing a support-wall side inclined surface 68.

For instance, in FIG. 15 and the like, the nozzle vane 14 has a non-support-wall side inclined surface 66. Nevertheless, in another embodiment, as shown in FIG. 18, the nozzle vane 14 may have a support-wall-side inclined surface 68. In the embodiment shown in FIG. 18, the end portion 62 of the nozzle vane 14 on the side of the support wall 16 includes a support-wall side inclined surface 68 connecting the suction surface 56 and the end surface 54 of the nozzle vane 14 on the side of the support wall 16. The support-wall side inclined surface 68 is inclined so that the distance from the pressure surface 42 of the nozzle vane 14 decreases toward the support wall 16. Further, the support-wall side linear portion 60 is formed on the boundary position between the support-wall side inclined surface 68 and the end surface 54 on the side of the support wall 16.

With the above configuration, when the nozzle vane 14 is inclined by the hydrodynamic force, it is possible to reduce the clearance between the support wall 16 and the end surface 54 of the nozzle vane 14 on the side of the support wall 16 uniformly. Accordingly, it is possible to suppress a clearance flow that flows between the support wall 16 and the end surface 54 of the nozzle vane 14 on the side of the support wall 16, and reduce loss due to the clearance flow. In particular, it is possible to improve the turbine performance at the time when the opening degree of the nozzle vane 14 is small. Further, it is possible to ensure the clearance between the support wall 16 and the end surface 54 of the nozzle vane 14 on the side of the support wall 16 at the time when the nozzle vane 14 is not inclined, and it is possible to suppress occurrence of sticking of the nozzle vane 14. Nevertheless, to suppress inclination itself of the nozzle vane 14, a support-wall side rib shaped portion should be provided as depicted in the drawing, rather than the embodiment depicted in the drawing.

Figure 19:
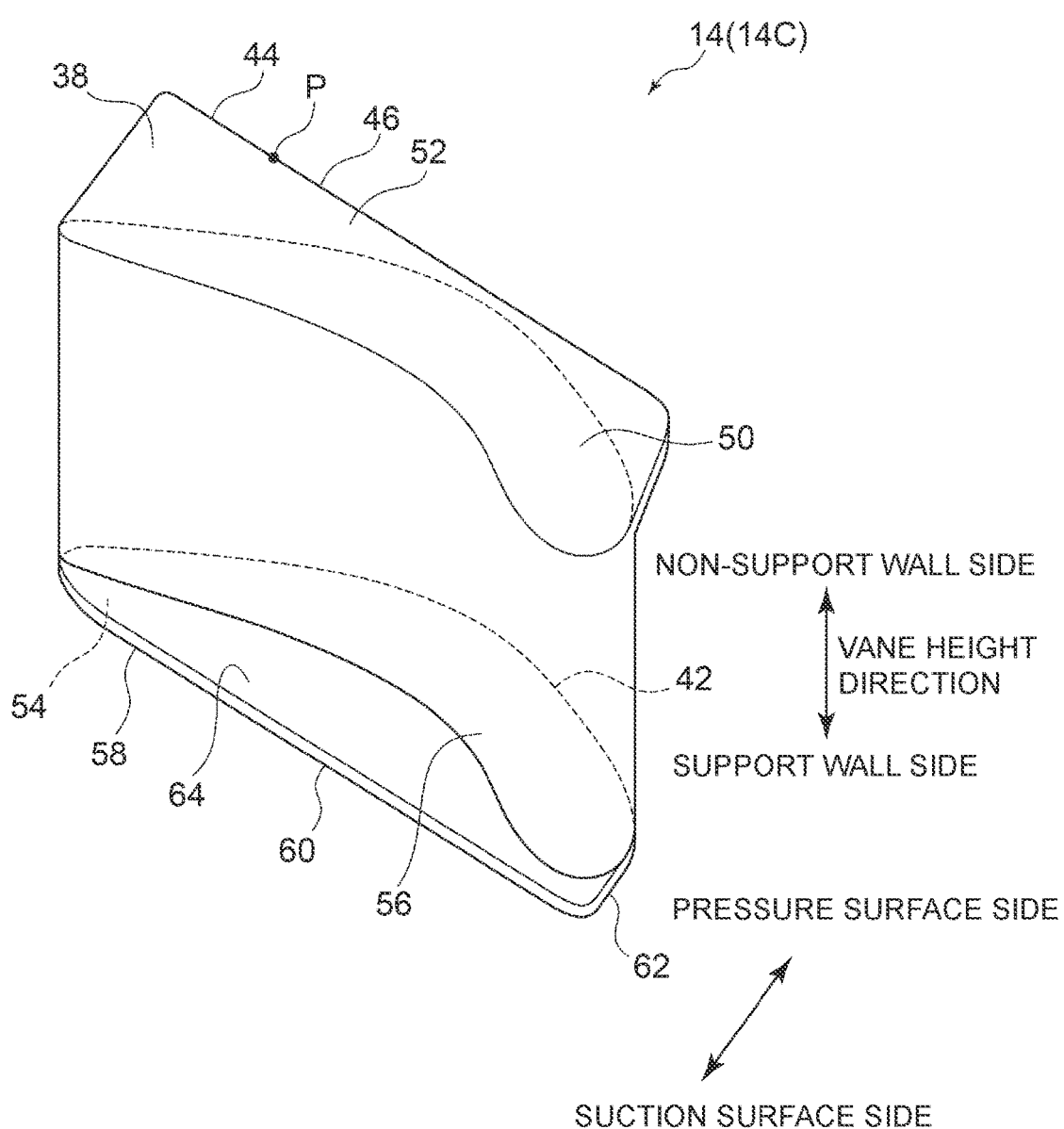
FIG. 19 is a schematic perspective view of a nozzle vane 14 (14C) according to an embodiment.
Figure 20:
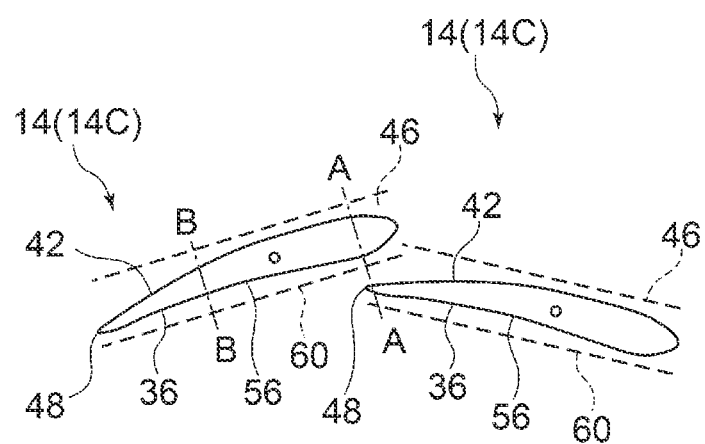
FIG. 20 is a diagram showing a vane profile 36 at a middle position in the vane height direction of the nozzle vane 14 (14C).
Figure 21:
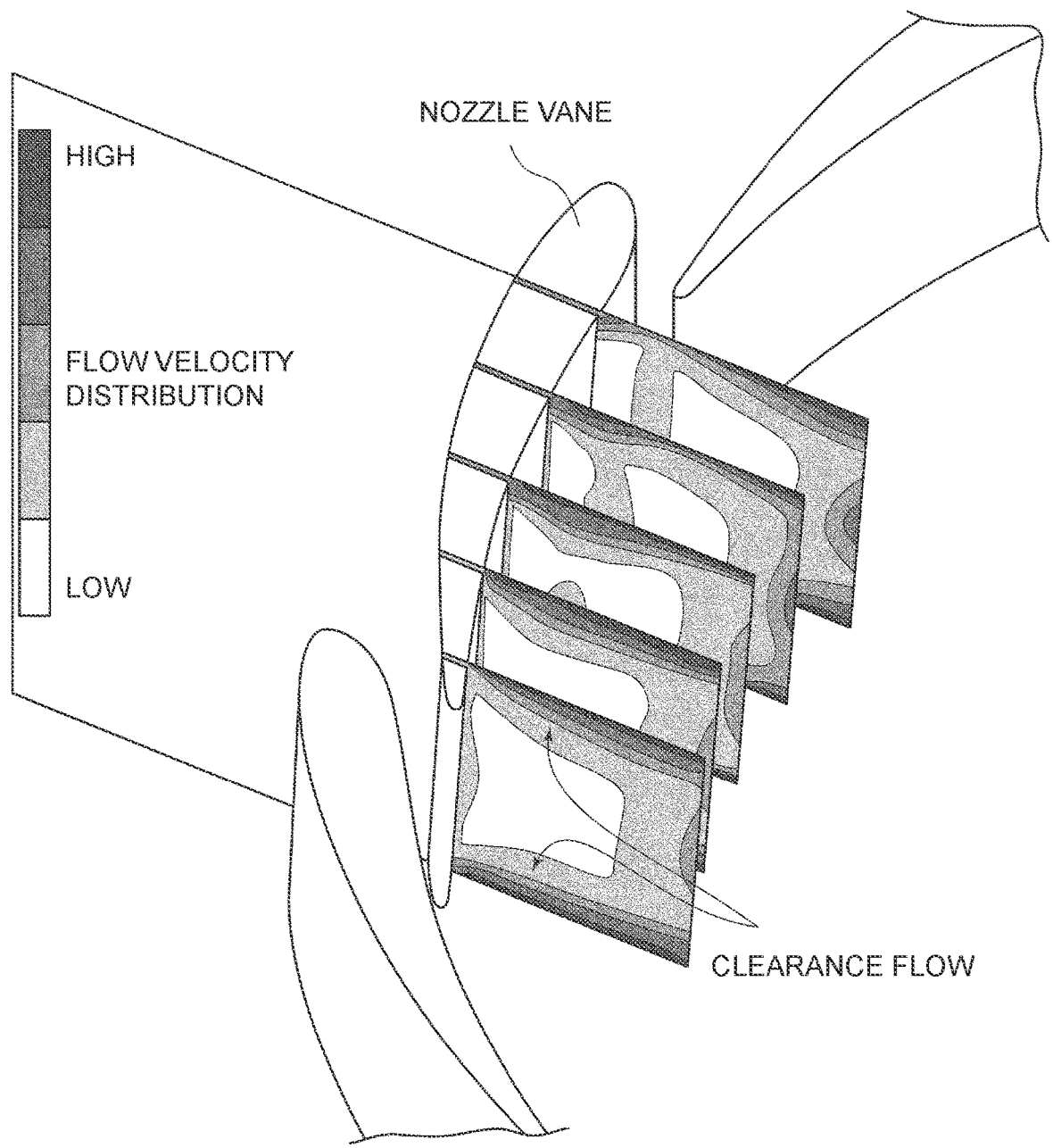
FIG. 21 is a diagram for describing a clearance flow.

Further, in the illustrative embodiment shown in FIGS. 2 and 3, in a view taken in the direction of the rotational axis of the nozzle vane 14, for instance, the non-support-wall side rib shaped portion 52 is disposed so as to protrude so that the non-support-wall side linear portion 46 extends on the tangent of the nozzle vane 14 to the pressure surface 42. Nevertheless, the present invention is not limited to this. For instance, as shown in FIGS. 19 and 20, in a view taken in the direction of the rotational axis of the nozzle vane 14, the non-support-wall side rib shaped portion 52 may protrude so that the non-support-wall side linear portion 46 extends on a line away from the pressure surface 42 of the nozzle vane 14.

Further, in the illustrative embodiment shown in FIGS. 2 and 3, in a view taken in the direction of the rotational axis of the nozzle vane 14, for instance, the support-wall side rib shaped portion 64 is disposed so as to protrude so that the support-wall side linear portion 60 extends on the tangent of the nozzle vane 14 to the suction surface 56. Nevertheless, the present invention is not limited to this. For instance, in a view taken in the direction of the rotational axis of the nozzle vane 14, as shown in FIGS. 19 and 20, the support-wall side rib shaped portion 64 may protrude so that the support-wall side linear portion 60 extends on a line away from the suction surface 56 of the nozzle vane 14.

Furthermore, in each embodiment described above, the nozzle vane 14 is supported on the flow passage wall 28 on the side of the bearing housing 10 in the axial direction, of the exhaust gas flow passage 26, in a cantilever fashion. Nevertheless, the present invention is not limited to this, and the nozzle vane 14 may be supported on the flow passage wall 32 on the opposite side to the bearing housing 10 in the axial direction, of the exhaust gas flow passage 26, in a cantilever fashion. That is, the support wall supporting the nozzle vane rotatably may be a flow passage wall opposite to the bearing housing in the axial direction of the exhaust gas flow passage.

DESCRIPTION OF REFERENCE NUMERALS

2 Turbine rotor
4 Scroll flow passage
6 Turbine housing
8 Bearing
10 Bearing housing
12 Variable nozzle mechanism 14 Nozzle vane
15 Shaft portion
16 Support wall
18 Non-support wall
20 Lever plate
22 Drive ring
23 Back plate
24 Nozzle support
26 Exhaust gas flow passage
28 Flow passage wall
30 Support hole
32 Flow passage wall
34 Shroud wall
36 Vane profile
38 End surface
42 Pressure surface
44 Edge portion
46 Non-support-wall side linear portion
48 Edge
50 End portion
52 Non-support-wall side rib shaped portion
54 End surface
56 Suction surface
58 Edge portion
60 Support-wall side linear portion
62 End portion
64 Support-wall side rib shaped portion
55 Non-support-wall side inclined surface
68 Support-wall side inclined surface
100 Turbocharger
C Chord length
P Position
x Chord directional distance

The invention claimed is:

1. A variable geometry turbocharger, comprising:
a turbine rotor; and
a variable nozzle mechanism for adjusting a flow of exhaust gas to the turbine rotor from a scroll flow passage formed on a radially outer side of the turbine rotor,
wherein the variable nozzle mechanism includes:
a nozzle vane disposed in an exhaust gas flow passage for guiding the exhaust gas to the turbine rotor from the scroll flow passage;
a support wall forming a flow passage wall on a first side of the exhaust gas flow passage with respect to an axial direction of the turbine rotor and supporting the nozzle vane rotatably in a cantilever fashion; and
a non-support wall forming a flow passage wall on a second side of the exhaust gas flow passage with respect to the axial direction, and
wherein, of an end surface of the nozzle vane on a side of the non-support wall, an edge portion on a side of a pressure surface includes a non-support-wall side linear portion formed to have a linear shape, and
wherein the non-support-wall side linear portion, extending in a longitudinal direction of the vane, that is parallel to a chord length of the nozzle vane, has a length which is not smaller than a half of the chord length of the nozzle vane.

2. The variable geometry turbocharger according to claim 1, wherein, of the edge portion on the side of the pressure surface, the non-support-wall side linear portion is formed in a range including a position where a chord directional distance from a trailing edge of the nozzle vane is ¼ of the chord length of the nozzle vane.

3. The variable geometry turbocharger according to claim 1,
wherein an end portion of the nozzle vane on a side of the non-support wall includes a non-support-wall side rib shaped portion protruding toward a pressure surface of the nozzle vane, and
wherein the non-support-wall side linear portion is formed on a tip portion of the non-support-wall side rib shaped portion.

4. The variable geometry turbocharger according to claim 3,
wherein, in a view taken in a direction of a rotational axis of the nozzle vane, the non-support-wall side rib shaped portion is disposed so as to protrude from the pressure surface, and wherein the non-support-wall side linear portion extends on the tip portion of non-support-wall side rib shaped portion.

5. The variable geometry turbocharger according to claim 1,
wherein an end portion of the nozzle vane on a side of the non-support wall includes a non-support-wall side inclined surface connecting the end surface of the nozzle vane on the side of the non-support wall and the pressure surface,
wherein the non-support-wall side inclined surface includes an inclined surface from the pressure surface to the end surface of the nozzle vane on the side of the non-support wall, and
wherein the non-support-wall side linear portion is formed on a boundary position between the non-support-wall side inclined surface and the end surface on the side of the non-support wall.

6. The variable geometry turbocharger according to claim 1,
wherein, of an end surface of the nozzle vane on a side of the support wall, an edge portion on a side of a suction surface has a support-wall side linear portion formed to have a linear shape.

7. The variable geometry turbocharger according to claim 6,
wherein the support-wall side linear portion and the non-support-wall side linear portion are formed to be parallel to each other.

8. The variable geometry turbocharger according to claim 6, wherein the support-wall side linear portion is formed in a range including a position where a chord directional distance from a trailing edge of the nozzle vane is ¼ of the chord length of the nozzle vane.

9. The variable geometry turbocharger according to claim 6, wherein the support-wall side linear portion has a length which is not smaller than a half of the chord length of the nozzle vane.

10. The variable geometry turbocharger according to claim 6,
wherein the non-support-wall side linear portion is longer than the support-wall side linear portion.

11. The variable geometry turbocharger according to claim 6,
wherein the end portion of the nozzle vane on the side of the support wall includes a support-wall side rib shaped portion protruding toward a suction surface of the nozzle vane, and
wherein the support-wall side linear portion is formed on the support-wall side rib shaped portion.

12. The variable geometry turbocharger according to claim 6, wherein the end portion of the nozzle vane on the side of the support wall includes a support-wall side inclined surface connecting the end surface of the nozzle vane on the side of the support wall and the pressure surface, wherein the support-wall side inclined surface includes an inclined surface from the suction surface to the end surface of the nozzle vane on the side of the support wall, and wherein the support-wall side linear portion is formed on a boundary position between the support-wall side inclined surface and the end surface on the side of the support wall.

13. The variable geometry turbocharger according to claim 6, wherein the nozzle vane is configured such that, when the nozzle vane is inclined due to a hydrodynamic force, the support-wall-side linear portion makes contact with the support wall before the non-support-wall side linear portion makes contact with the non-support wall.

* * * * *